United States Patent
Figge, Sr. et al.

(10) Patent No.: US 7,578,122 B1
(45) Date of Patent: Aug. 25, 2009

(54) ROCKET MOTOR CASE USING PLANK SECTIONS AND METHOD OF MANUFACTURE

(75) Inventors: Irving Edward Figge, Sr., Manassas, VA (US); Phillip Henry Graham, Warrenton, VA (US)

(73) Assignee: Aerojet General Corporation, Redmond, WA (US)

( * ) Notice: Subject to any disclaimer, the term of this patent is extended or adjusted under 35 U.S.C. 154(b) by 1826 days.

(21) Appl. No.: 08/811,598

(22) Filed: Feb. 26, 1997

Related U.S. Application Data

(63) Continuation of application No. 08/393,776, filed on Feb. 24, 1995, now abandoned.

(51) Int. Cl.
*F02K 9/08* (2006.01)
(52) U.S. Cl. .......................................................... 60/255
(58) Field of Classification Search ..................... 29/1.1, 29/1.2, 1.21, 898.067; 102/481, 489; 220/585, 220/588, 591, 9.1, 401, 668, 669, 676, 677, 220/682, 900, 913; 428/33, 588, 589, 591, 428/595, 600; 60/253, 255
See application file for complete search history.

(56) References Cited

U.S. PATENT DOCUMENTS

| | | | | |
|---|---|---|---|---|
| 3,080,639 A | * | 3/1963 | Maurizi et al. | 29/898.067 |
| 3,114,960 A | * | 12/1963 | Einaudi | 29/898.067 |
| 3,144,703 A | * | 8/1964 | Einaudi et al. | 29/898.067 |
| 3,171,563 A | * | 3/1965 | Bernd | 220/591 X |
| 3,209,533 A | | 10/1965 | Light | |
| 3,254,487 A | * | 6/1966 | Baher | 220/669 X |
| 3,256,585 A | * | 6/1966 | Ripple | 29/898.067 |
| 3,353,246 A | * | 11/1967 | Farmer | 29/898.067 |
| 3,371,488 A | | 3/1968 | Turner | |
| 3,429,027 A | * | 2/1969 | Siepmann | 29/463 |
| 3,453,715 A | * | 7/1969 | Rogers | 29/463 X |
| 3,540,615 A | | 11/1970 | Studkey et al. | |
| 4,041,869 A | | 8/1977 | San Miguel | |
| 4,136,916 A | * | 1/1979 | Musselman et al. | 29/898.067 |
| 4,458,482 A | | 7/1984 | Vetter et al. | |
| 4,478,151 A | | 10/1984 | Vetter et al. | |
| 4,982,870 A | | 1/1991 | Van Loon | |
| 5,170,007 A | | 12/1992 | Figge, Sr. | |
| 5,228,285 A | * | 7/1993 | Van Name et al. | 102/481 X |
| 5,280,706 A | * | 1/1994 | Yorgason | 102/481 X |
| 5,410,809 A | * | 5/1995 | Alling | 29/898.067 |

* cited by examiner

*Primary Examiner*—Timothy D Collins
(74) *Attorney, Agent, or Firm*—Nixon & Vanderhye, PC; Frank P. Presta

(57) ABSTRACT

A rocket motor case includes a plurality of plank sections which provide a structural key for locking metal and/or composite end enclosures in place as part of the motor case. The plank sections are sized longitudinally to form venting spaces in the motor case sidewall to allow passive venting in the event of propellant ignition during cook-off. The plank sections have plank legs which are surrounded by tailorable roll-bonded sheet material to complete formation of the motor case sidewall.

8 Claims, 3 Drawing Sheets

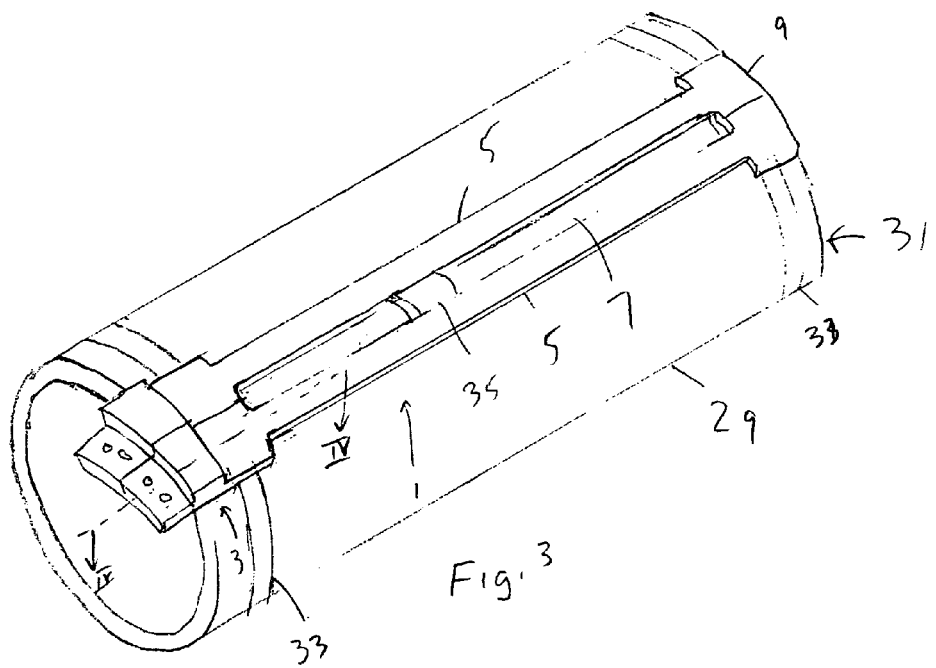
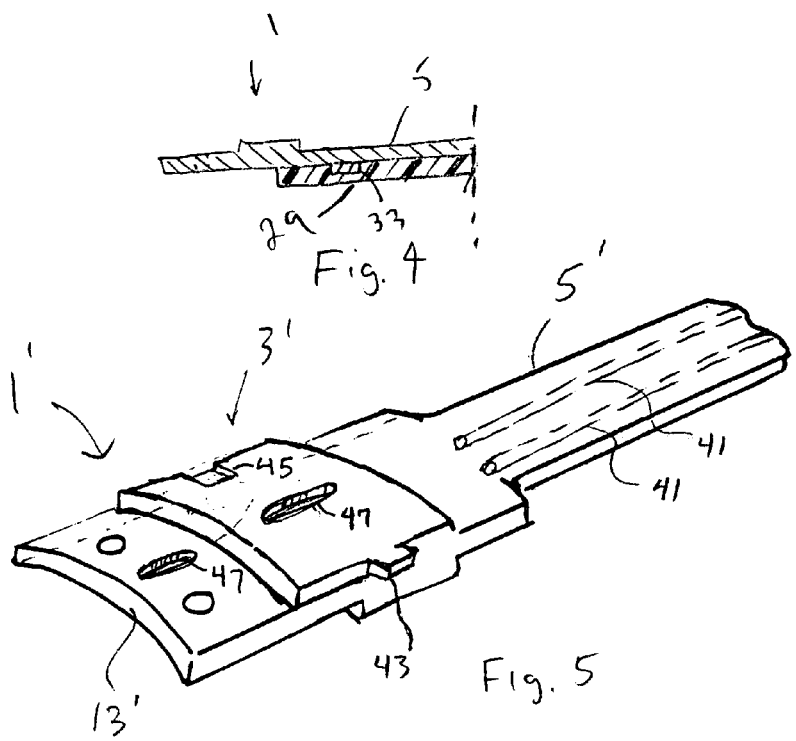

ROCKET MOTOR CASE USING PLANK SECTIONS AND METHOD OF MANUFACTURE

This application is a continuation of application Ser. No. 08/393,776 filed Feb. 24, 1995 and now abandoned.

FIELD OF THE INVENTION

The present invention is directed to a rocket motor case using plank sections and a method of manufacture and, in particular, plank sections which form a slotted case sidewall construction to meet insensitive munitions guidelines.

BACKGROUND ART

Casings or cases such as those for rocket motor combustion chambers or war heads which contain heat sensitive energetic materials such as propellant grains or explosive material present a serious safety hazard. If the casing should be exposed to fire or other high temperature environments when not in use, an explosion may result. Under these conditions, the heat sensitive energetic material within the casing can ignite and cause catastrophic thermal stress and pressure buildup within the case with subsequent explosion. Responsive to this hazard, military tests and specifications have been developed to assure that these types of rocket motor combustion chambers or warheads are designed so that these types of hazards do not occur as a result of fires, other high temperature environments or penetration of the casing by a bullet or other high speed fragment.

The prior art has proposed various solutions to avoid case explosions when subjected to such things as fuel fire, cook-off conditions or projectile and/or shock scenarios. For example, U.S. Pat. No. 4,458,482 to Vetter et al. discloses a rocket motor which will undergo a small local case rupture and produce a mild burning reaction to prevent a dangerous buildup of interior pressure.

U.S. Pat. No. 4,041,869 to San Miguel discloses a rocket motor casing using a "cook-off liner with discontinuities therein to allow room for a thermal expansion of propellant grain or the cook-off liner without significantly reducing the protection of the rocket motor.

U.S. Pat. No. 5,070,007 to Figge discloses a tailorable, roll-bonded, insensitive munitions case which loses its structural integrity upon reaching a predetermined temperature which is below the auto ignition temperature of the housed heat-sensitive energetic material. This patent is incorporated by reference in its entirety herein.

Although various solutions have been proposed to overcome the problems discussed above with these types of cases, the prior art still includes numerous disadvantages. Many of the prior art designs are costly to manufacture in that detailed and complicated machining is required to meet the insensitive munition guidelines. Moreover, the prior art designs are typically rigid in nature and do not offer a wide flexibility in accommodating different size cases and/or different types of heat sensitive energetic materials.

In view of these disadvantages, a need has developed to provide an improved rocket motor case which meets the insensitive munition guidelines but is lower in cost to manufacture and more flexible in meeting various design specifications. Responsive to this need, the present invention provides an improved rocket motor case which utilizes plank sections which are easily configured to a given motor case design. The plank sections, in combination with roll bonded sheets, offer both passive and active case venting prior to propellant cook-off.

SUMMARY OF THE INVENTION

Accordingly, it is a first object of the present invention to provide an improved rocket motor case which meets insensitive munition guidelines.

Another object of the invention is to provide a rocket motor case which is lower in cost to manufacture and offers both passive and active venting and structural separation prior to propellant cook-off.

A further object of the present invention is to provide a plank section which is adaptable with rocket motor case enclosures and roll bonded sheets to form an improved rocket motor case.

A still further object of the present invention is to provide a rocket motor case construction which offers design flexibility and is adaptable for both slow and fast cook-off conditions.

Other objects and advantages of the present invention will become apparent as a description thereof proceeds.

In satisfaction of the foregoing objects and advantages, the present invention, in one aspect, provides a plank section for use in manufacturing a rocket motor case which includes an enclosure and roll bonded sidewalls. The plank section includes a plank body having a plank leg extending therefrom. The plank body has a defined width and transverse arcuate cross section such that a plurality of plank sections joined together form a continuous structure corresponding to the rocket motor case circumference. Each plank leg has a width less than the defined width of the plank body such that adjacent plank legs form a venting space therebetween and therealong the rocket motor case. The venting space allows for release of pressure from within the rocket motor case. The plank body is typically attached to the case end closure. It should be noted that whereas the incorporation of venting space into the planks offers pressure relief and thereby a benefit in hazardous reaction mitigation, the omission of venting space for certain applications still provides the lower cost manufacturing benefits of the embodied invention.

In another aspect of the invention, a rocket motor case is disclosed utilizing the plank section described above. The plank sections attach to the end enclosure and surround the heat sensitive energetic material of the rocket motor case. Overlaying the plank legs are roll bonded sheets as disclosed in U.S. Pat. No. 5,170,007.

In a preferred embodiment, the plank sections are secured to a tubular insulating bladder by seal rings at opposite ends thereof. This assembly attaches to the enclosure of the case such as a dome or flat plate, the enclosure and assembly surrounding the heat sensitive energetic material in the rocket motor case.

The invention also describes a method of making a rocket motor case using the plank sections and tailorable roll-bonded sheet material. The plank sections are mated together or can be attached to the rocket motor case enclosure or a substrate such as the seal ring-containing tubular insulating bladder. The tailorable roll bonded sheets are then applied to surface portions of the plank sections to form the rocket motor case wall.

BRIEF DESCRIPTION OF THE DRAWINGS

Reference is now made to the drawings of the invention wherein:

FIG. 3 is a perspective view of an alternative embodiment of the invention;

FIG. 4 is a cross-sectional view along the line IV-IV of FIG. 3;

FIG. 5 is a perspective view of another embodiment of the invention.

DESCRIPTION OF THE PREFERRED EMBODIMENTS

The inventive rocket motor case overcomes several of the disadvantages in prior art munitions and rocket motor casings. By using a discreet number of plank sections as part of the rocket motor case, the case is lower in cost than prior art designs and is more conducive to inspection techniques to meet government specifications. Since the inventive rocket motor casing uses discreet planks as part of its construction, defects in a given plank do not require reworking of the entire motor case structure. The defective plank can be discarded and substituted with an in-spec plank without excessive down time during the manufacturing procedure or high reworking costs.

Using the plank construction of the invention, a rocket motor casing can be tailored through a wide range of length to diameter ratios for a given rocket motor case. The plank sections of the invention can be made in any length and any arcuate transverse cross section to achieve a given case diameter and cross-section. The inventive planks provide a structural key for locking domes or other types of closures used in rocket motor case without the need for threaded connections. Each plank section shares in providing axial stiffness and torsional stiffness when roll bonded and load support for the rocket motor case and provides equivalent mechanical properties as a solid case when used in conjunction with the roll bonded sheet material described below.

The plank sections also provide case venting through interplank slotted channels to permit passive venting in the event of propellant ignition during cook-off. These slots can also contain early initiating charges which force case venting (active venting) at temperatures determined by the chemistry of the charge.

Figure 1:
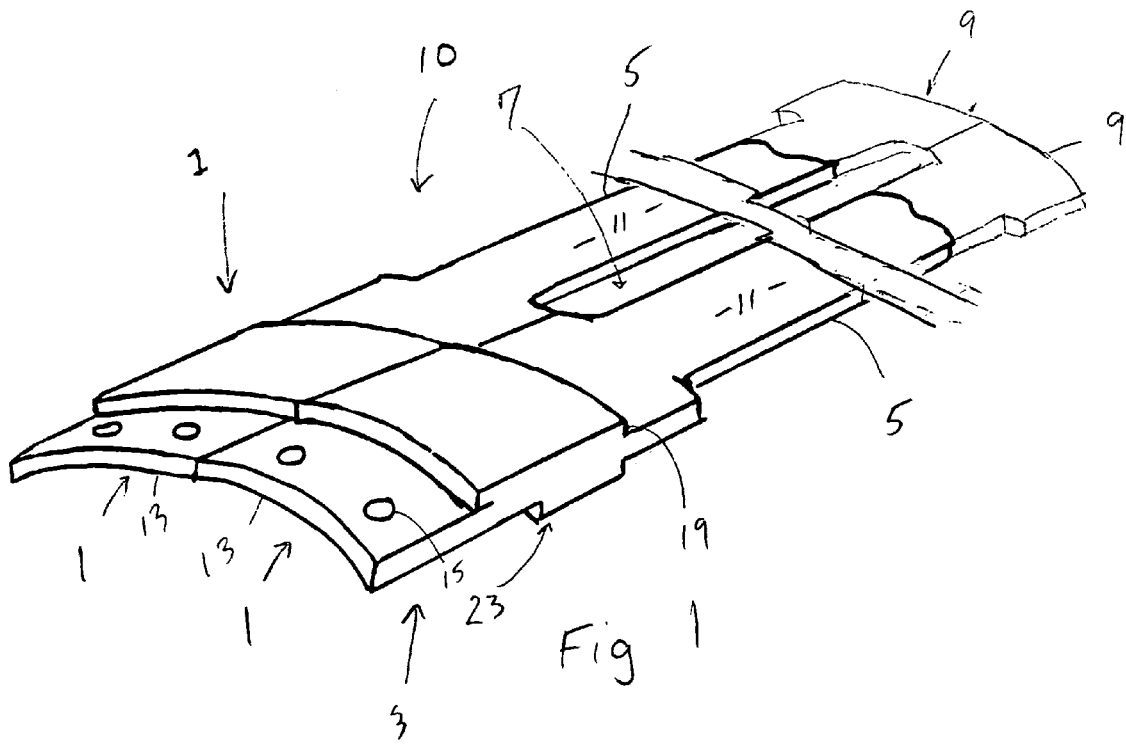
FIG. 1 is a perspective view of a pair of plank sections according to the invention.

With reference now to FIG. 1, a pair of plank sections joined or mated together are designated by the reference numeral 10. Each plank section 1 includes a plank body 3 with plank legs 5 extending therefrom. The plank body 3 is of a desired width and a transverse cross-sectional arcuate shape so that when the plank sections 1 are mated together, they form a cylinder of a desired diameter for rocket motor case construction.

The width of the plank leg 5 is less than the plank body so that a venting space 7 is formed between adjacent plank sections 1 when they are mated together. The plank legs 5 can terminate in end portions 9 which correspond in width to the plank body 3. The end portions 9 also mate together as part of the rocket motor case construction.

The plank legs 5 have an outer surface 11 which is designed to receive tailorable roll-bonded sheet material as disclosed in U.S. Pat. No. 5,170,007 and described hereinafter.

Figure 2:
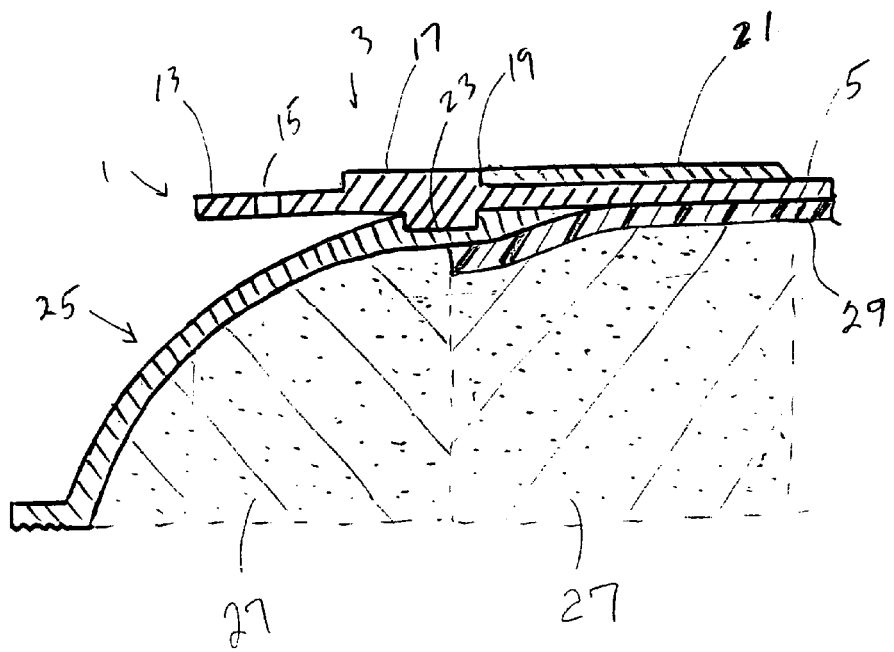
FIG. 2 is a partial cross-sectional view of a rocket motor casing of the invention showing two different internal configurations.

The plank body 3 facilitates attachment to a rocket motor case enclosure such as a dome or flat plate. With reference now to FIGS. 1 and 2, the plank body 3 has a skirt portion 13 with bores 15 therethrough. The skirt portion 13 facilitates attachment of the rocket motor case to another stage. The bores 15 assist in connecting the additional stage to the skirt 13. The bores 15 when used with an appropriate collar ring and bolts facilitate the assembly operation by maintaining plank alignment and position during roll-bonding. Additionally, these bores, used in conjunction with an interstage section, a second casing, or a collar ring, materially assist in stiffening the planked case.

The plank body 3 also has a raised portion 17 which forms a step 19. The step 19 acts as a stop for the tailorable roll-bonded sheet material 21 which is wrapped around the plank legs 5 and forms the rocket motor case sidewall.

Figure 6:
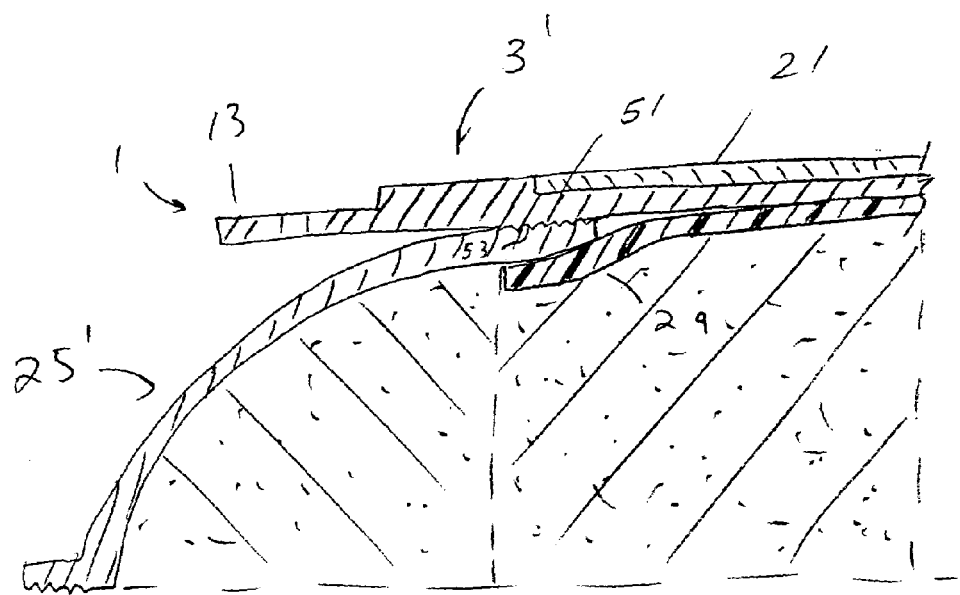
FIG. 6 is an alternative embodiment to the sectional view shown in FIG. 2.

The plank body 3 also has a raised portion 23 which attaches to the enclosure 25. It should be understood that the raised portion 23 of plank body 3 engaging a corresponding recess in the enclosure 25 is only an exemplary mode of attaching the plank section 1 to the enclosure 25. Any known means of fastening the structures together can be utilized. For example, the components can be secured using adhesives, fasteners, or any other known bonding or fastening techniques. The plank body 3 may also have a threaded portion thereon for threadable attachment to the enclosure 25. FIG. 6 shows an exemplary threadable attachment wherein enclosure 25' is threaded to plank body 3' via complementary threaded portions 51 and 53, respectively.

With specific reference to FIG. 2, the rocket motor case is formed by the union of the enclosure 25 and plank section 1 in conjunction with the tailorable roll bonding sheet material 21. In one embodiment, the enclosure 25 and plank sections 1 can be bonded or attached directly to a cured propellant or other heat sensitive energetic material 27 located within the rocket motor case.

Alternatively, a tubular insulation bladder 29 can be interposed between the plank section 1 and enclosure 25 and the heat sensitive energetic material 27. In this embodiment, the plank sections and enclosure can be bonded directly to the insulation bladder or, as will be discussed below, the plank sections can be bonded to sealing rings which are incorporated with the insulation bladder. Preferably, the planks are used in conjunction with the insulation bladders such that there is no gas path directly to the planks.

The plank sections can be made of any material suitable for use in a rocket motor case. Examples of such materials include metallic, non-metallic or composite materials. Examples of these types of materials include fiber reinforced thermoplastics or fiber reinforced precured thermosetting materials. Other materials include metallic composite materials such as aluminum, titanium or similar metals with reinforcing material such as boron, silicon carbide, graphite or the like.

With reference again to FIGS. 1 and 2, the tailorable roll-bonded sheet material 21 is applied on the surfaces 11 of the plank legs S. As disclosed in U.S. Pat. No. 5,170,007, the sheet material 21 such as a thermoplastic or thermosetting fiber-reinforced broadgood is roll bonded over the plank legs 5 to provide the required hoop strength for the rocket motor case. By tailoring the softening temperature for the adhesive used in the roll-bonding process, the roll-bonded sheet material or broadgoods would lose interlaminar strength at a temperature below propellant ignition. Thus, the broadgoods separate permitting the rocket motor case to dismantle and lose pressure and load bearing capacity rather than explode. Preferably, the roll-bonded sheet material is not bonded to the surfaces 11 of the plank legs 5 in the areas separating the venting spaces 7. By omitting the roll-bonding adhesive in these areas, the venting spaces 7 are connected by a unimpeded gas passage which facilitates the venting function when needed.

In the broadest embodiment of making the rocket motor casing, the plank sections 1 are attached both to the casing enclosure and are surrounded by the roll-bonded sheet material, the roll bonding performed as is known in the art. The enclosure, plank sections and roll bonded sheet material formed the rocket motor case surrounding either the heat sensitive energetic material or the insulation bladder which in turn surrounds the heat sensitive energetic material. As described above, the rocket motor cases can be combined utilizing the plank section skirts 13, if desired.

In a more preferred embodiment, with reference FIGS. 3 and 4, the plank sections 1 are first attached to a seal-ring containing tubular assembly 31. For clarity purposes, only two plank sections are shown attached to the assembly 31. The tubular assembly 31 comprises the insulation bladder 29 and a pair of sealing rings 33 embedded therein and located at ends thereof. The plank sections 1 are attached to the sealing rings 33 in any conventional fashion such as adhesives, fasteners, etc. As is evident from FIG. 3, the sealing rings 33 attach to the plank sections in such a manner to allow the venting space 7 to be unimpeded for the passive venting function. In this method of manufacture, the plank sections 1 are sequentially laid around the tubular assembly to form a cylindrical surface to receive the tailorable roll-bonded sheet material. The roll bonding of the sheet material can be first applied to the plank legs 5 followed by attachment of the plank bodies 3 to the rocket motor case end enclosure (not shown). Alternatively, the plank bodies 3 can be first attached to the end enclosure followed by roll bonding of the sheet material.

The sealing rings 33 at both ends of the plank sections 1 enhance the sealing of the rocket motor casing. That is, the rings facilitate attachment between adjacent plank sections to avoid caps or leaks therethrough and contribute to the structural integrity of the tubular assembly.

In another embodiment, an initiation charge 35 can be located in the venting space 7 to provide active venting at temperatures determined by the chemistry of the particular charge in the rocket motor case. Since these types of initiating charge devices are well known in the art, see U.S. Pat. No. 4,478,151 to Vetter et al., hereby incorporated in its entirety by reference, a further detailed description thereof is not deemed necessary for understanding of the invention.

It should be understood that the plank sections can be utilized in any type of a solid rocket or a solid gas generator motor case which uses munitions such as projectiles and/or bombs. Moreover, given the ability to tailor the dimensions of the plank sections in both width and length, the plank sections can be utilized with any shape case enclosure and can be configured for attachment thereto in any known manner.

FIG. 5 shows an alternative embodiment of the inventive plank section designated by the reference numeral 1'. In this embodiment, stiffening ribs 41 are incorporated into the planks 5'. The stiffening ribs can be integrally formed with the plank legs 5' or attached to a surface thereof. The stiffening ribs enhance bending and, buckling resistance, particularly for plank legs of narrower widths or extended lengths. The plank body 3' can include a tongue and groove construction. A tongue 43 is located on one side of the plank body 3' with a corresponding groove 45 located on the other side. In this embodiment, the tongue and groove are located at the surface of the plank body 3' permitting the plank 1' interlocking during assembly operations. The tongue 43 engages the groove 45 of an adjacent plank section to facilitate mating thereto and rocket motor case structural integrity. Of course, other types of tongue-in-groove joints may be utilized to facilitate adjacent plank section attachment. This type of attachment may also be used in combination with other forms of attachment for mating the adjacent plank sections together such as adhesive bonding or the like. The skirt section 13' and/or the plank body 3' of the plank section can also include slots 47 therein for rocket motor case fin attachment (See FIG. 5). These fins can be attached in the slots using any known bonding or fastening techniques.

The stiffening ribs 41 can also be arranged in a slot in the plank leg surface rather than being integrally formed therewith.

The use of the plank sections permits the construction of a low cost hybrid metal/composite or composite/composite solid casing tailorable to meet insensitive munition requirements. By adjustment of the plank section dimensions, the size of the venting space can be controlled for a given heat sensitive energetic material and rocket motor case design to optimize the rocket motor case ability to release any pressure build-up due to slow or fast cook-offs before an explosion can occur. The use of the tailorable roll-bonded sheet material provides a further flexibility in combination with the plank sections to meet these types of munition requirements. That is, the roll-bond overwrapping can be controlled by selection of the appropriate number of layers to hold the plank sections together while still being tailorable to meet the insensitive munition requirements.

As such, an invention has been disclosed in terms of preferred embodiments thereof which fulfill each and every one of the objects of the present invention as set forth hereinabove and provides a new and improved rocket motor casing using novel plank sections.

Of course, various changes, modifications and alterations from the teachings of the present invention may be contemplated by those skilled in the art without departing from the intended spirit and scope thereof. Accordingly, it is intended that the present invention only be limited by the terms of the appended claims.

The invention claimed is:

1. A rocket motor case plank section for use in making a rocket motor case having an end closure and being overwrapped with sheet material, said plank section comprising a plank body having a plank leg extending between first and second ends thereof, each of the first and second ends having opposed sides separated by a defined width and having upper and lower surfaces which are curved in shape so that a plurality of plank bodies joined together at the sides thereof form a cylinder corresponding to said rocket motor case, said plank leg having a width less than said defined width of said first and second ends so that adjacent plank legs form a venting space therebetween for release of pressure from within said rocket motor case, said plank body being configured to attach to an end closure of said rocket motor case and having means on the outer surface thereof for forming a stop for the overwrapped sheet material.

2. The rocket motor case plank section of claim 1, further comprising a sealing element associated with the lower surface of at least one of the first and second ends to facilitate sealing of the rocket motor case.

3. The rocket motor case plank section of claim 1, wherein said plank body has a threaded portion for threaded attachment to an end closure of said rocket motor case.

4. The rocket motor case plank section of claim 1, wherein said plank body has at least one tongue on one side and a corresponding groove on the other side, a tongue of one plank body engaging a groove of an adjacent plank body when said plank sections are joined together.

5. The rocket motor plank section of claim 1, wherein said plank leg includes a longitudinal stiffening rib.

6. The rocket motor plank section of claim 1, wherein said plank body has a slot therein to receive a fin of said rocket motor case.

7. The rocket motor plank section of claim 1, wherein said stop means of said plank body comprises a first step therein, and the inner surface of said plank body has a second step for engaging said end closure of said rocket motor case.

8. The rocket motor case plank section of claim 1, wherein said plank section is made from a metallic or composite material.

* * * * *